SYSTEM FOR CONTROLLING OR REGULATING AN ELECTRIC MOTOR BY PULSES OF VARIABLE PULSING RATIO

Filed Aug. 2, 1955

United States Patent Office 2,867,763

Patented Jan. 6, 1959

2,867,763

SYSTEM FOR CONTROLLING OR REGULATING AN ELECTRIC MOTOR BY PULSES OF VARIABLE PULSING RATIO

Georg Sichling, Erlangen, Germany, assignor to Siemens-Schuckertwerke Aktiengesellschaft, Berlin-Siemensstadt and Erlangen, Germany, a corporation of Germany Application August 2, 1955, Serial No. 526,009

Claims priority, application Germany August 3, 1954

16 Claims. (Cl. 318—317)

My invention relates generally to the control or regulation of electric machines and other apparatus in dependence upon a variable, i. e., adjustable or condition-responsive, direct voltage. More particularly, the invention relates to the control of an electric load by pulses of a variable and controlled pulsing ratio produced with the aid of a semiconductor amplifier system, the "pulsing ratio" being defined as the ratio of the pulse cycle period to the duration of the individual pulse occurring within that period. From another aspect, the invention also relates to a system for translating a continuous direct voltage of variable magnitude into a square-wave voltage of a proportionately time-modulated pulse duration.

For various control purposes, including the regulation of a load for constancy of a desired operating condition, and particularly in the fields of power engineering, there arises often the problem of securing a reliable and accurate response to minute measuring or error signals. This requires the provision of a regulating amplifier which, controlled by the signal, acts upon the controlling or regulating component of the regulating machine, device, or load circuit proper. The signal values thus to be responded to are often available as direct-current magnitudes, particularly as direct voltages; and, in many cases, an accurate representation of such a magnitude by a signal transmitter or signal translating device is secured only if a given current load upon the transmitter or source of the signal is not exceeded. For preventing such overloads it would be desirable to employ regulating amplifiers of high input impedance; but this requirement is not inherently met by the static and rugged amplifying devices preferred for such purposes. That is, the desired high input impedance is not readily available if magnetic amplifiers or dynamoelectric amplifiers are to be used. For that reason it appears desirable to add a pre-amplifier of highest possible input impedance. Known amplifiers of this kind are electron-tube amplifiers. Often, however, such amplifiers are objectionable, for instance in industrial plants or aboard ship, because of such inherent disadvantages as appreciable aging, appreciable demand for heating power, mechanical sensitivity or, generally, excessive maintenance requirements.

Similar to electronic-tube amplifiers are those employing transistors, such as germanium or silicon transistors. Recently there have been developed other semi-conductor devices having a semiconductor body formed by a chemical binary compound ($A_{III}$ $B_V$), such as indium antimonide, of respective elements from the third group, second subgroup, and fifth group, second subgroup, of the periodic system of elements, as described in detail in the copending application of H. Welker, Serial No. 275,-785, filed March 10, 1952, now Patent No. 2,798,989, for Semiconductor Devices and Method of Their Manufacture, assigned to the assignee of the present invention.

Now, while transistors and other semiconductor amplifiers do not have the above-mentioned shortcomings of electronic tubes, they involve another difficulty as regards their use for power control purposes. That is, such semiconductor devices are readily controllable only up to a given, usuallly relatively small power output. For that reason, magnetic amplifiers and dynamo-electric amplifying machines, requiring a considerable current input, could not, heretofore, be satisfactorily controlled by semiconductor amplifiers so as to meet the technological and economical requirements of most practical applications. While magnetic amplifiers requiring a particularly small input power have become known, their time constant is so large as to make them unsuitable for rapid technical regulating operation. The relation between the required controlling power and the time constant of an amplifier is defined as "control energy." This control energy, as a rule, must exceed a given, appreciable minimum value for controlling a magnetic amplifier; but it is not readily possible to take from transistors or other semiconductor amplifiers of high input power requirements more control energy than is permitted by the heating of these devices lest the semiconductor body be damaged or destroyed.

It is, therefore, an object of my invention to devise a system for regulating or otherwise controlling an electric machine or other load in response to a variable direct voltage, which obviates the disadvantages of the various apparatus above-mentioned and provides a regulating amplifier of the static type that combines the favorable impedance conditions and low power requirements of a semiconductor device with a much wider range of reliably controllable power output than heretofore realized.

It has been proposed to control transistors and other semiconductor amplifier devices by an artifice which, in principle, makes it possible to employ such devices within a relatively wide control range. This artifice is predicated upon the observation that the power loss in such an amplifier, due to its hyperbolic control characteristic, is smaller in the initial (near-zero) control region and in the fully controlled (saturated) region as compared with intermediate control values especially in the middle range of the characteristic. It has therefore been proposed to pass rapidly through the intermediate range so that the semiconductor amplifier member is predominantly operated only in the blocked (closed) stage and in the open stage and the power losses during the transition intervals of the control performance can occur only during negligibly short intervals of time thus preventing excessive heating and damage. Such a control is effected in dependence upon the ratio of on-to-off operations and hence requires a square-wave voltage of variable pulsing ratio at the control terminals of the amplifier.

Another, more specific object of my invention therefore is to devise a control system which, for performing such an on-and-off control, provides a controllable square-wave pulse at the input side of the semiconductor amplifier and permits accurately modulating the square-wave pulses from smallest to highest values of the pulsing ratio in reliable dependence upon the variations of a continuous direct voltage; and it is a correlated object to obtain this effect by means of entirely static and rugged circuit components of utmost simplicity.

According to the invention, I dispose in the control circuit of the system a pulse generator or oscillator of, at least approximately, triangular pulse voltage, and I connect this pulse voltage in series opposition with an adjustable or condition-responsive direct voltage whose magnitude is variable at least between the zero value and the peak value of the triangular pulse voltage. A semiconductor amplifier has its input side connected in the circuit of the series opposed voltages to be controlled by a voltage resulting from the difference of the respective pulse and direct voltages; and this amplifier is fully conductive or "open" already at a very slight value of its control voltage in comparison with the peak value of the triangular pulse voltage. The semiconductor amplifier then supplies in its output circuit a square-wave voltage whose pulsing ratio corresponds to the magnitude of the variable direct voltage so that the effective power output is likewise dependent upon the variations of the direct voltage.

In systems according to the invention, the semiconductor amplifiers may be equipped with point-contact or junction transistors whose semiconductor body is formed of germanium or silicon. As mentioned, other controllable semiconductor devices are likewise applicable including those formed of the above-mentioned $A_{III} B_V$ compounds such as InSb. Also applicable for the purposes of the invention are semiconductor devices of the magnetic barrier type. The semiconductor body, for instance of germanium, in such devices is subjected to a magnetic field directed across the current axis of the body, and the body is given such a shape or surface texture as to develop a magnetic barrier layer when simultaneously subjected to current flow and to the magnetic field. For instance, the body may be prismatic and may have two surfaces parallel to the current flow and also parallel to the field; and by having one of these surfaces polished to mirror finish while the opposite surface is etched, the occurrence of asymmetrical conductance due to the magnetic barrier effect is secured. Such magnetic-barrier semiconductors are controllable, as to conductance, by a magnetic field, by an electric field or by radiation. Magnetic-barrier semiconductors are disclosed more in detail in the copending application of H. Welker, Serial No. 297,788, filed July 8, 1952, now Pat. No. 2,736,858, for Controllable Electric Resistance Devices, assigned to the assignee of the present invention. Reference may also be had to the article by E. Weisshaar and H. Welker "Magnetische Sperrschichten in Germanium," Zeitschrift für Naturforschung, vol. 8a, No. 11, 1953, pages 681–686.

The above-mentioned and other objects and features of the invention will be apparent from the following description of the embodiments illustrated on the drawings.

Figures 1, 2:
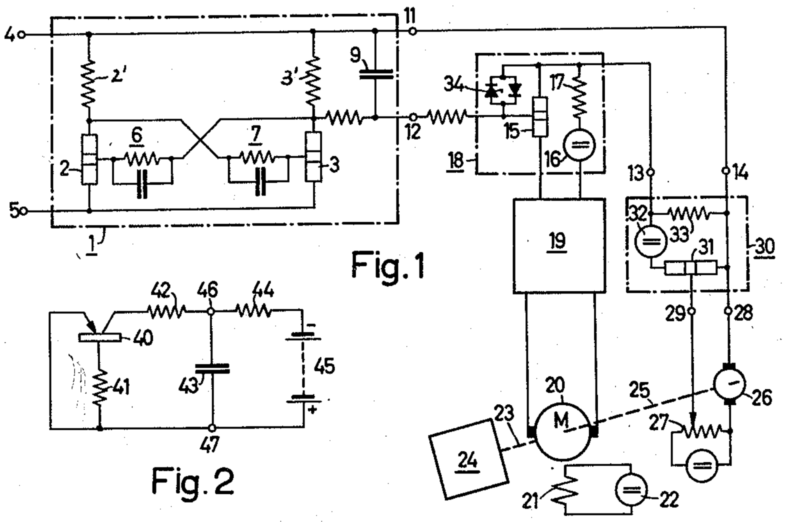
Fig. 1 shows by way of an example the schematic circuit diagram of a motor control system according to the invention.
Fig. 2 shows a modified square-wave oscillator applicable in a system otherwise in accordance with Fig. 1.

In the regulating system illustrated in Fig. 1 triangular voltage pulses are produced by a pulse generator 1 operating on the multivibrator principle. The pulse generator 1 comprises two junction transistors 2, 3 in a circuit connection known as such, and is energized from any suitable current source to be connected to the power supply terminals 4 and 5. Two timing components 6 and 7, each comprised of a resistor and a capacitor, essentially determine the frequency of the triangle pulses being generated. The junction transistors 2 and 3 open and close alternately. As a result, square-wave voltages are impressed across the resistors 2' and 3'. Due to the voltage of resistor 3', a capacitor 9 is periodically charged through a resistor 8 and thereafter discharges each time so that the triangular voltage pulses appear across the capacitor at terminals 11, 12.

Such triangular pulses, which may form a continuous train or saw-tooth voltage, may also be produced by other RL- or RC-oscillators or any other pulse generators known for such purposes. For instance, a different embodiment of a circuit for generating a triangle voltage is illustrated in Fig. 2. This pulse generator operates with a single point-contact transistor 40. A capacitor 43 is connected between the collector electrode and the base electrode of the transistor through respective resistors 41 and 42. The capacitor 43 is charged through a resistor 44 from a current source 45 as long as the transistor resistance between collector and base is large. When a given voltage at capacitor 43 is reached, the resistance between collector and base suddenly collapses, and the capacitor discharges through the transistor. The transistor resistance between base and collector then again becomes large. The capacitor charges again, and the performance is repeated. Hence this pulse generator operates as a relaxation oscillator and produces across capacitor 43 a saw-tooth voltage available across the terminals 46 and 47.

Preferable for the purposes of the invention are triangle-wave pulse generators whose pulse flanks are as linear as possible. This secures good proportionality between the controlling direct voltage and the pulsing ratio of the square-wave voltage impressed upon the semiconductor amplifier still to be described.

According to Fig. 1 the triangle voltage across the terminals 11, 12 of pulse generator 1 is connected in series opposition with a direct voltage supplied from the terminals 13, 14. The resultant differential voltage is impressed upon the input circuit of a semiconductor amplifier 15 which for instance is shown also equipped with a junction transistor. A source 16 of constant voltage supplies direct current to the semiconductor amplifier 15. The circuit of this current source comprises a series connected resistor 17. The semiconductor amplifier 15 together with the circuit components connected thereto and, if desired, together with a subsequent auxiliary amplifier forms a square-wave generator 18. How the square-waves are produced and controlled by the coaction of the triangle voltage at terminals 11, 12 and the controllnig direct voltage at terminals 13, 14 is explained further below. Connected to the output circuit of the square-wave generator 18 is a suitable power amplifier 19 of any desired type, for instance a magnetic amplifier. This amplifier operates as the regulating amplifier proper. It energizes the armature 20 of a motor M whose revolving speed is to be regulated. The field winding 21 of motor M is shown supplied by constant excitation from a direct-current source 22. The field excitation is assumed to have a properly chosen or adjusted value so that the speed of motor M depends upon the voltage supplied to its armature. The motor M is connected through a shaft 23 with a machine tool or other machinery 24 to be operated.

For regulating the speed of motor M and hence the speed of the machine 24, a tachometer dynamo 26 is coupled with motor M through a shaft 25. The direct voltage generated by the tachometer dynamo 26 is proportional to the revolving speed. This tachometer voltage is connected in series opposition to a direct voltage tapped off a potentiometric control rheostat 27. The tapped-off voltage represents the datum value of the desired speed to be kept constant. When the actual speed departs from the datum speed selected by the setting of the control rheostat 27, a regulating error voltage occurs across the terminals 28, 29. The error voltage is amplified by a direct-current amplifier consisting of another semiconductor amplifier 30. The amplified error voltage is impressed across the above-mentioned terminals 13, 14 in series opposition to the triangle voltage from oscillator 1. In some cases depending upon the particular application, no amplification of the error voltage is needed. Then the error voltage is directly connected in series opposition to the triangle voltage supplied from the pulse generator 1.

The semiconductor amplifier 30, which in the illustrated embodiment servies to secure exacting requirements as to regulating accuracy, is also shown equipped with a junction transistor 31. The current supply for this transistor is schematically represented by a direct current source 32. The output resistor of this amplifier is denoted by 33. The illustration of amplifier 30 as well as of the other components of the system shown in Fig. 1, is limited to the components essential to the desired performance.

In practice, and depending upon the particular requirements to be met, the conventional auxiliary and accessory components may of course be provided. For instance, to prevent a control operation to go beyond the desired range and to thereby cause damage to the semiconductor amplifier 15, a voltage-dependent resistor 34 consisting of anti-parallel connected dry rectifiers may be arranged, as shown at 34, in shunt connection to the input terminals.

Figure 3:
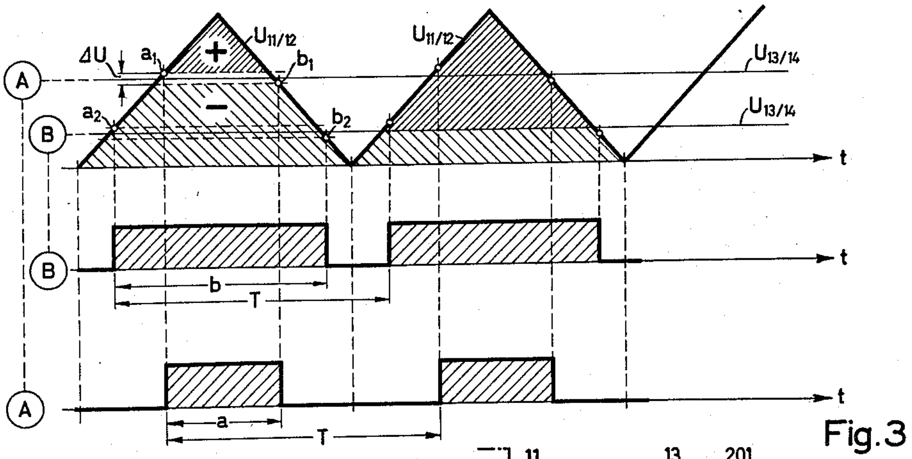
Fig. 3 is a graphical representation explanatory of the system according to the invention.

Fig. 3 serves to explain the occurrence and control of the square-wave pulses at the output terminals of the square-wave generator 18. Curve $U_{11/12}$ represents the triangle-pulse voltage across the terminals 11, 12 (Fig. 1) of the pulse generator 1 in dependence upon time *t*. The semiconductor amplifier 15 is rated for operation with full conductance when as little as a small fraction of the peak value of voltage $U_{11/12}$ is effective. Consequently, if the triangular pulses were alone effective, the semiconductor amplifier 15 would be open during substantially the entire cycle period. Actually however, since the direct voltage $U_{13/14}$, representing the amplified regulating error, is added in series opposition to the amplifier input circuit, the control voltage effective in the input circuit of the semiconductor amplifier 15 is equal to the difference between the voltages $U_{11/12}$ and $U_{13/14}$. The direct voltage $U_{13/14}$ appears in the diagram of Fig. 3 as a straight line parallel to the time axis *t*. By varying this direct voltage $U_{13/14}$ there result different points of intersection between the curves $U_{11/12}$ and $U_{13/14}$. For example, two different values of $U_{13/14}$ are indicated in the diagram, the large value being denoted by A and the smaller value by B. Within each triangular pulse wave, there are two points of intersection. At point $a_1$ or $b_1$ the semiconductor amplifier 15 (Fig. 1) opens, and at point $a_2$ or $b_2$ the amplifier again closes. In case A, the voltage curves illustrated in the lower portion of Fig. 3 occur in the output circuit of the semiconductor amplifier 15. Consequently, a periodic and abrupt opening and closing of the circuit takes place within the interval, denoted by $\Delta U$, between the two horizontal broken lines, depending upon whether the difference between triangle voltage $U_{11/12}$ and direct voltage $U_{13/14}$ is positive or negative. In case A the pulsing ratio is $T_{/a}$, whereas in the case B the pulsing ratio is $T_{/b}$.

Effective in each case, with respect to the regulation of the motor M in Fig. 1, is the time-integrated median value of the square-wave curves (A or B). Assume, for instance, that in the embodiment of Fig. 1, the motor M operates under properly regulating conditions, that is at exactly the desired speed, when the pulsing ratio is 2:1. When the actual speed departs upwardly from the datum value, the pulsing ratio becomes larger than 2:1; and when the actual speed is less than the datum value this ratio will be smaller than 2:1. As a result the system regulates itself for maintenance of constant motor speed.

According to another feature of the invention the square-wave pulse generator 18 (Fig. 1) is preferably push-pull connected so that the joint application of a variable control voltage and a triangular pulse voltage results in the formation of alternately positive and negative square-wave pulses whose pulsing ratio is proportional to the control voltage. In contrast to uni-directional square-wave pulses, such a sequence of positive and negative pulses can more easily be transformed without giving cause to a uni-directional magnetic load upon the transformer. The embodiment shown in Fig. 4 represents an example of this kind.

Figure 4:
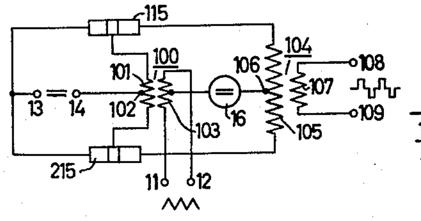
Figs. 4 and 5 illustrate the respective circuit diagrams of two other embodiments according to the invention.

Fig. 4 shows two junction transistors 115 and 215 which have their respective control circuits energized from a common control voltage applied to the terminals 13, 14 as a direct voltage. Located in the common portion of the control circuit of both transistors is a transformer 100 whose primary winding 101 has a mid-tap 102 and whose secondary winding 103 is impressed by a constant triangular voltage applied to the terminals 11, 12. Another transformer 104 is connected in the common output circuit of the transistors 115, 215. The primary winding 105 of transformer 104 is ilkewise provided with a mid-tap 106. The secondary winding 107 of transformer 104 provides across its terminals 108, 109 the desired voltage composed of positive and negative square-wave pulses. The pulsing ratio of this square-wave voltage is proportional to the control voltage impressed upon the terminals 13, 14. A current source 16, corresponding to the source 16 in Fig. 1, serves for energizing the collector circuits of the transistors 115 and 215. If the device according to Fig. 4 is to be employed in a regulating system otherwise corresponding to Fig. 1, then the device takes the place of the square-wave generator 18 shown in Fig. 1; and the terminals 108 and 109 are then to be connected to the input side of the power amplifier 19.

Figure 5:
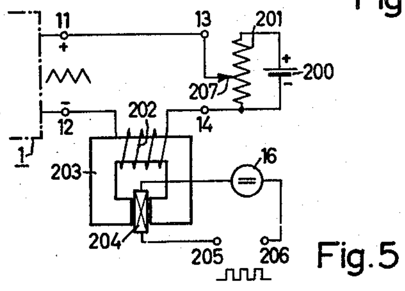

If a semiconductor amplifier which operates with a semiconductor element having a magnetic barrier layer is used a circuit arrangement according to Figure 5 may be employed.

Similar to Figure 1, Figure 5 shows a pulse generator 1 which at its output terminals 11, 12 delivers a triangle voltage. Connected in opposition to this triangle voltage is a direct-current voltage which is taken from the terminals 13 and 14. It is delivered, for example, from a battery 200 and may be adjusted by means of a potentiometer 201. The total voltage formed of the triangle voltage and the direct-current voltage is supplied to the control winding 202 of a preferably laminated iron core 203 in the air gap of which is arranged a semiconductor element 204 having a magnetic barrier layer. The semiconductor element is available in a direct-current circuit which is fed from a current source 16. The desired square-wave voltage is taken from the output terminals 205 and 206 of the direct-current circuit. The pulsing ratio of the square-wave voltage may be varied by adjusting the tap 207 of the potentiometer 201. With regard to the effect of the circuit arrangement according to Figure 5 practically the same result is obtained as in the case of the square-wave generator 18 of Figure 1 the operation of which has been more fully described hereinbefore with reference to Figures 2 and 3. However, a magnetically controlled semiconductor element having a magnetic barrier layer is used instead of a galvanically controlled semiconductor element (transistor 15).

It will be understood by those skilled in the art, upon a study of this disclosure, that my invention is not limited to the particular embodiments nor to the particular example of application described in the foregoing, but may also be embodied with the aid of other circuit connections for the control or regulation of any desired load. When applying devices according to the invention for control purposes not requiring a regulating operation, the direct voltage acting in series oppositon to the triangle voltage represents the pattern or adjusted datum voltage which may then be supplied simply from the adjustable tap of a potentiometer rheostat energized from a source of constant voltage. The setting of the potentiometer tap then corresponds to a definite pulsing ratio of the square-wave voltage being generated and, conversely, each available pulsing ratio corresponds to a discrete position of the potentiometer tap or a definite condition of the equipment to be controlled. It is also obviously intended that the direct current control voltage of Fig. 3 can be derived as shown in Fig. 1. Devices according to the invention are well suited for remote control due to the fact that their control circuits operate essentially in dependence upon voltage ratios so that an increased resistance in the control circuit does not have a disturbing effect.

I claim:

1. An electric power supply system, comprising a transistor device having full conductance at a relatively small predetermined impressed voltage; means for producing output pulses therefrom having a pulse duration proportional to the magnitude of a direct current input signal impressed thereon, said means comprising a pulse generator producing triangular pulses having a peak voltage which is a relatively large multiple of such relatively small voltage; a signal voltage source producing a direct current signal voltage having a magnitude variable between the zero and peak values of the pulse voltage; and means connecting the outputs of said pulse generator and signal voltage source to the input of said transistor device in series opposing relation to each other to impress on said transistor device pulses which are the resultant of said triangular pulses and said signal voltage to produce at the transistor device output square-wave pulses of a duration corresponding to the magnitude of said signal voltage.

2. A system for controlling flow of electric power from a power source to a load comprising, in combination, a power amplifier controlling delivery of power from the source to the load; a semiconductor device having full conductance at a relatively small predetermined impressed voltage and connected to the input of said power amplifier; a pulse generator producing triangular pulses having a peak voltage which is a relatively large multiple of such relatively small voltage; a signal voltage source producing a direct current signal voltage having a magnitude variable between the zero and peak values of the pulse voltage in accordance with variations in a characteristic of the load; and means connecting the outputs of said pulse generator and signal votlage source to the input of said semiconductor device in series opposing relation to each other to impress on said transistor device pulses which are the resultant of said triangular pulses and said signal voltage to produce at the semiconductor device output square-wave pulses of a duration corresponding to the magnitude of said signal voltage to control said power amplifier to maintain said characteristic at a pre-set value.

3. In a power supply system according to claim 2, said signal voltage source comprising a first source of direct current voltage having a constant pre-adjusted value and a second source of direct current voltage having a value variable from said pre-set value as a function of the variations in such characteristic, said first and second sources being connected in opposition to produce a differential signal voltage representative of the variation in such characteristic from a predetermined value.

4. In a power supply system according to claim 2, said semiconductor device comprising a semiconductor connected in the output circuit of said device and having a magnetic barrier layer; and magnetic field means in its input circuit, to whose field said semiconductor is subjected.

5. In a power supply system according to claim 2, said pulse generator comprising a transistor oscillator network having a pulse output of fixed amplitude and frequency, and said signal voltage source comprising a first source of direct current voltage having a constant pre-adjusted value and a second source of direct current voltage having a value variable from said pre-set value as a function of the variations in such characteristic, said first and second sources being connected in opposition to produce a differential signal voltage representative of the variation in such characteristic from a predetermined value.

6. In a system according to claim 2, said semiconductor device being a transistor device comprising two opposingly related semiconductor members interconnected in push-pull relation and having the output circuit in common to supply thereto amplified pulses of alternately positive and negative polarity.

7. In a system according to claim 2, said semiconductor device being a transistor device comprising two transistors interconnected in push-pull relation, said transistors having respective input circuits and a common output circuit, said two input circuits having a portion in common and said source of direct voltage being connected in said portion, said pulse generator being inductively coupled with said respective input circuits to individually impress thereupon said pulse voltage, and a transformer having a primary winding in said common output circuit and having a secondary winding in the transistor output circuit, whereby said secondary winding supplies said pulses of variable pulsing ratio as alternately positive and negative pulse waves.

8. An apparatus control system, comprising a control circuit and load apparatus to be regulated in respect to a condition of operation of said load apparatus, means governed by variations in said apparatus operating condition to provide a correlated, variable, regulating, direct voltage, a triangular pulse voltage generator connected in the control circuit of the system, the triangular pulse voltage being connected in series opposition with the said direct voltage, the magnitude of said direct voltage being variable at least between the zero value and the peak value of the triangular pulse voltage, a square-wave voltage generator junction transistor device, the junction transistor having a middle zone of one conductivity characteristic and end zones of opposite conductivity characteristic, the transistor having input connections connected to the middle zone and one end zone, and a source of direct current supply connected to an end zone, the transistor device having its input side connected in the circuit of the series opposed voltages, said device being controlled by the voltage resulting from the difference of the triangular pulse and direct voltages, said device being fully conductive at a value of its control voltage that is small in comparison with the peak value of the triangular pulse voltage, the device supplying a square-wave voltage whose pulsing ratio, defined as the ratio of the pulse cycle period to the duration of the individual pulse occurring within that period, corresponds to the magnitude of the variable direct voltage, power amplifier means input connected to the square-wave voltage transistor device and output connected to the load apparatus, the effective power output of the power amplifier means being dependent upon the variations of the direct voltage.

9. An apparatus control system, comprising a control circuit and load apparatus to be regulated in respect to a condition of operation of said load apparatus, means governed by variations in said apparatus operating condition to provide a correlated, variable, regulating, direct voltage, a triangular pulse voltage generator connected in the control circuit of the system, the triangular pulse voltage being connected in series opposition with the said direct voltage, the magnitude of said direct voltage being variable at least between the zero value and the peak value of the triangular pulse voltage, a square-wave voltage generator junction transistor device, the junction transistor having a middle zone of one conductivity characteristic and end zones of opposite conductivity characteristic, the transistor having input connections connected to the middle zone and one end zone, and a source of direct current supply connected to an end zone, the transistor device having its input side connected in the circuit of the series opposed voltages, said device being controlled by the voltage resulting from the difference of the triangular pulse and direct voltages, said device being fully conductive at a value of its control voltage that is small in comparison with the peak value of the triangular pulse voltage, the device supplying a square-wave voltage whose pulsing ratio, defined as the ratio of the pulse cycle period to the duration of the individual pulse occurring within that period, corresponds to the magnitude of the variable direct voltage, power amplifier means having its input connected to the square-wave voltage device and its output connected to energize the armature of a motor, means rotated by the motor rotor, said load apparatus being operated by rotation of said means, means coupled to the rotated means to provide a regulating direct voltage correlated with a function of the speed of rotation thereof, said coupled means comprising said means governed by variations in said apparatus operating condition.

10. A motor speed control system, comprising a control circuit and a motor whose speed is to be regulated, means governed by variations in motor speed to produce a correlated, variable, direct regulating voltage, a triangular pulse voltage generator connected in the control circuit of the system, the triangular pulse voltage being connected in series opposition with the said direct voltage, the magnitude of said direct voltage being variable at least between the zero value and the peak value of the triangular pulse voltage, a square-wave voltage output semiconductor device having its input side connected in the circuit of the series opposed voltages, said device being controlled by the voltage resulting from the difference of the triangular pulse and direct voltages, said device being fully conductive at a very small value of its control voltage in comparison with the peak value of the triangular pulse voltage, the device supplying a square-wave voltage whose pulsing ratio, defined as the ratio of the pulse cycle period to the duration of the individual pulse occurring within that period, corresponds to the magnitude of the variable direct voltage, power amplifier means connected between the motor and the square-wave voltage output semiconductor device, the effective power output of the power amplifier means and the power input of the motor being dependent upon the variations of the direct regulating voltage.

11. A motor speed control system, comprising a control circuit and a motor whose speed is to be regulated, means governed by variations in motor speed to produce a correlated, variable, direct regulating voltage, a triangular pulse voltage generator connected in the control circuit of the system, the triangular pulse voltage being connected in series opposition with the said direct voltage, the magnitude of said direct voltage being variable at least between the zero value and the peak value of the triangular pulse voltage, a square-wave voltage output semiconductor device having its input side connected in the circuit of the series opposed voltages, said device being controlled by the voltage resulting from the difference of the triangular pulse and direct voltages, said device being fully conductive at a very small value of its control voltage in comparison with the peak value of the triangular pulse voltage, the device supplying a square-wave voltage whose pulsing ratio, defined as the ratio of the pulse cycle period to the duration of the individual pulse occurring within that period, corresponds to the magnitude of the variable direct voltage, power amplifier means having its input connected to the square-voltage output device and having its output connected to energize the armature of the motor, the time-integrated median value of the square-wave curve being effective to regulate the motor, said means governed by variations in motor speed comprising a tachometer operatively connected to the rotor of the motor and generating a direct voltage correlative to the rotor speed, said direct voltage being connected in series opposition to a pre-set direct voltage representing the datum value corresponding to the desired constant value of motor speed, to provide a direct regulating error voltage, which error voltage is said variable direct regulating voltage.

12. A control system for relatively high controlled power output to a load, comprising a control circuit and load apparatus to be regulated, means to produce a variable, regulating direct voltage, a triangular pulse voltage generator connected in the control circuit of the system, the triangular pulse voltage being connected in series opposition with the said direct voltage, the magnitude of said direct voltage being variable at least between the zero value and the peak value of the triangular pulse voltage, a square-wave voltage output junction transistor device having its input side connected in the circuit of the series opposed voltages, said device being controlled by the voltage resulting from the difference of the triangular pulse and direct voltages, said junction transistor comprising a semiconductor having a middle semiconductor zone connected to an output terminal of the pulse voltage generator, and having two outer semiconductor zones of opposite conduction characteristic to which a direct current supply source and the output terminals of said transistor are connected, said device being fully conductive at a very small value of its control voltage in comparison with the peak value of the triangular pulse voltage, the device supplying a square-wave voltage whose pulsing ratio, defined as the ratio of the pulse cycle period to the duration of the individual pulse occurring within that period, corresponds to the magnitude of the variable direct voltage, power amplifier means connected between the load apparatus and the square-wave voltage output semiconductor device, the effective power output of the power amplifier means being dependent upon the variation of the direct voltage.

13. An apparatus control system, comprising a control circuit and load apparatus to be regulated in respect to a condition of operation of said apparatus, a triangular pulse voltage generator connected in the control circuit of the system, means forming a direct current control voltage that is responsive to variations in said load apparatus operating condition, the triangular pulse voltage being connected in series opposition with the said direct voltage, the magnitude of said direct voltage being variable at least between the zero value and the peak value of the triangular pulse voltage, a square-wave voltage generator transistor device having its input side connected in the circuit of the series opposed voltages, said generator device being controlled by the voltage resulting from the difference of the triangular pulse and direct voltages, said generator device being fully conductive at a very small value of its control voltage in comparison with the peak value of the triangular pulse voltage, the generator device supplying a square-wave voltage whose pulsing ratio, defined as the ratio of the pulse cycle period to the duration of the individual pulse occurring within that period, corresponds to the magnitude of the variable direct voltage, power amplifier means connected between the load apparatus and the square-wave voltage generator transistor device, the effective power output of the power amplifier means being dependent upon the variations of the direct voltage, said square-voltage generator device comprising two junction transistors having their respective control circuits energized from terminals supplying a common control voltage which is said direct current control voltage, a first transformer having a primary winding which is connected in a common portion of the said control circuits and the mid-tap of which primary winding is connected to one of said terminals, said first transformer having its secondary winding impressed by said triangular voltage, the transistors having a common output circuit, a second transformer having its primary winding connected in said common output circuit, the mid-tap of which primary winding is connected to the secondary winding of the first transformer, a direct current source energizing the collector circuits of the two transistors, the second transformer having a secondary winding connected to the input side of the power amplifier to provide positive and negative square-wave pulses.

14. System for controlling an electric load in dependence upon a variable direct voltage, comprising a control circuit, a pulse generator of approximately triangular pulse voltage connected in said circuit, a source of continuous direct controlling voltage of variable magnitude connected in said circuit in series opposition to said pulse voltage, said source having a voltage range comprising voltage values between the zero and peak values respectively of said triangular pulse voltage and comprising two related component voltage supply means connected in opposition to provide a regulating error voltage, one of said voltage supply means having an adjustable direct voltage corresponding to a desired datum value, said other voltage supply means being responsive to an operating condition of the load, whereby said direct controlling voltage varies in accordance with the regulating error voltage of the system, a semiconductor transistor amplifier having a load circuit to be controlled and having a signal circuit connected with said control circuit and responsive to the difference of said triangular pulse voltage and said controlling direct voltage, said transistor amplifier having full rated conductance at a slight magnitude of said difference voltage as compared with the peak value of said triangular pulse voltage, whereby said load circuit is energized by pulses having a pulsing ratio varying in accordance with said direct voltage.

15. A motor speed control system, comprising a control circuit and a motor whose speed is to be regulated, means governed by variations in motor speed to produce a correlated, variable, direct regulating voltage, a triangular pulse voltage generator connected in the control circuit of the system, the triangular pulse voltage being connected in series opposition with the said direct voltage, the magnitude of said direct voltage being variable at least between the zero value and the peak value of the triangular pulse voltage, a square-wave voltage output semiconductor device having its input side connected in the circuit of the series opposed voltages, said device being controlled by the voltage resulting from the difference of the triangular pulse and direct voltages, said device being fully conductive at a very small value of its control voltage in comparison with the peak value of the triangular pulse voltage, the device supplying a square-wave voltage whose pulsing ratio, defined as the ratio of the pulse cycle period to the duration of the individual pulse occurring within that period, corresponds to the magnitude of the variable direct voltage, power amplifier means having its input connected to the square-voltage output device and having its output connected to energize the armature of the motor, the time-integrated median value of the square-wave curve being effective to regualte the motor, said means governed by variations in motor speed comprising a tachometer operatively connected to the rotor of the motor and generating a direct voltage correlative to the rotor speed, said direct voltage being connected in series opposition to a pre-set direct voltage representing the datum value corresponding to the desired constant value of motor speed, to provide a direct regulating error voltage, which error voltage is said variable direct regulating voltage, said semiconductor device comprising a junction transistor having a middle zone of one conductivity characteristic and end zones of opposite conductivity characteristic, the transistor having its input connections connected to the middle zone and one end zone, and a source of direct current supply connected to an end zone.

16. The apparatus defined in claim 15, the transistor comprising an $A_{III}B_{V}$ semiconductor compound.

References Cited in the file of this patent

UNITED STATES PATENTS

| | | |
|---|---|---|
| 2,086,918 | Luck | July 13, 1937 |
| 2,445,568 | Ferguson | July 20, 1948 |
| 2,498,678 | Grieg | Feb. 28, 1950 |
| 2,680,160 | Yaeger | June 1, 1954 |
| 2,683,809 | Fromm | July 13, 1954 |
| 2,695,930 | Wallace | Nov. 30, 1954 |
| 2,731,567 | Syiklai et al. | Jan. 17, 1956 |

FOREIGN PATENTS

| | | |
|---|---|---|
| 580,738 | Great Britain | Sept. 18, 1946 |